US011126070B2

(12) United States Patent
Rossell

(10) Patent No.: US 11,126,070 B2
(45) Date of Patent: Sep. 21, 2021

(54) PROJECTOR HOLDER

(71) Applicant: Mimono LLC, Doral, FL (US)

(72) Inventor: Joseph Christian Rossell, Guatemala (GT)

(73) Assignee: Mimono LLC, Doral, FL (US)

(*) Notice: Subject to any disclaimer, the term of this patent is extended or adjusted under 35 U.S.C. 154(b) by 0 days.

(21) Appl. No.: 16/460,794

(22) Filed: Jul. 2, 2019

(65) Prior Publication Data

US 2020/0004116 A1  Jan. 2, 2020

Related U.S. Application Data

(63) Continuation of application No. 15/998,759, filed on Aug. 16, 2018, now Pat. No. 10,379,429, which is a
(Continued)

(51) Int. Cl.
| | |
|---|---|
| *G03B 21/54* | (2006.01) |
| *B29C 39/10* | (2006.01) |
| *F16M 11/40* | (2006.01) |
| *F16M 13/02* | (2006.01) |
| *G03B 29/00* | (2021.01) |

(Continued)

(52) U.S. Cl.
CPC .......... *G03B 21/145* (2013.01); *B29C 39/10* (2013.01); *F16M 11/40* (2013.01); *F16M 13/022* (2013.01); *G03B 21/16* (2013.01); *G03B 21/54* (2013.01); *G03B 29/00* (2013.01); *H04N 9/3141* (2013.01); *B29K 2083/00* (2013.01); *B29L 2031/3475* (2013.01)

(58) Field of Classification Search
CPC ...... G03B 21/145; G03B 29/00; G03B 21/16; G03B 21/54; H04N 9/3141; F16M 13/022; F16M 11/40; B29C 39/10; B29L 2031/3475; B29K 2083/00
See application file for complete search history.

(56) References Cited

U.S. PATENT DOCUMENTS

| D55,977 S | 8/1920 | Brown |
|---|---|---|
| D275,683 S | 9/1984 | Donnelly et al. |

(Continued)

FOREIGN PATENT DOCUMENTS

| CN | 1498358 A | 5/2004 |
|---|---|---|
| CN | 1815355 A | 8/2006 |

(Continued)

OTHER PUBLICATIONS

International Search Report and Written Opinion for Application No. PCT/US2017/037605 dated Jul. 28, 2017.

*Primary Examiner* — Michelle M Iacoletti
*Assistant Examiner* — Danell L Owens
(74) *Attorney, Agent, or Firm* — Wolf, Greenfield & Sacks, P.C.

(57) ABSTRACT

A method and apparatus for mounting a projector holder to or placing a projector holder on an object for displaying an image onto a surface is disclosed. The projector holder includes a body within which a projector is at least partially disposed. The body includes one or more pliable appendages that are adapted to be manipulated and deformed from a first configuration to a second configuration. In some embodiments, the body is formed in the shape of an animal.

8 Claims, 12 Drawing Sheets

Related U.S. Application Data continuation of application No. 15/788,557, filed on Oct. 19, 2017, now abandoned, which is a continuation of application No. 15/376,518, filed on Dec. 12, 2016, now Pat. No. 9,891,509.

(60) Provisional application No. 62/351,527, filed on Jun. 17, 2016.

(51) Int. Cl.
  *H04N 9/31* (2006.01)
  *G03B 21/16* (2006.01)
  *G03B 21/14* (2006.01)
  *B29K 83/00* (2006.01)
  *B29L 31/34* (2006.01)

(56) References Cited

U.S. PATENT DOCUMENTS

| | | | |
|---|---|---|---|
| 5,545,072 A * | 8/1996 | Arad | A63H 3/003 446/219 |
| 7,064,956 B2 | 6/2006 | Patel | |
| 8,251,536 B2 | 8/2012 | Bevirt | |
| D694,761 S | 12/2013 | Zoll | |
| 8,714,756 B2 | 5/2014 | Yang | |
| D803,929 S | 11/2017 | Rossell | |
| D803,930 S | 11/2017 | Rossell | |
| D803,931 S | 11/2017 | Rossell | |
| 9,891,509 B2 | 2/2018 | Rossell | |
| D835,704 S | 12/2018 | Rossell | |
| 10,379,429 B2 | 8/2019 | Rossell | |
| 2001/0007527 A1 | 7/2001 | Lammers et al. | |
| 2005/0157269 A1 | 7/2005 | Seto et al. | |
| 2006/0044522 A1 | 3/2006 | Feliss et al. | |
| 2006/0170669 A1 * | 8/2006 | Walker | H04N 1/00352 345/418 |
| 2006/0170885 A1 * | 8/2006 | Kitahara | G03B 21/16 353/119 |
| 2008/0122137 A1 | 5/2008 | Hamaoka | |
| 2008/0232097 A1 * | 9/2008 | Gandhi | F21L 4/04 362/191 |
| 2009/0121104 A1 | 5/2009 | Chen et al. | |
| 2010/0002198 A1 | 1/2010 | Chuang | |
| 2010/0240277 A1 | 9/2010 | Rapp | |
| 2011/0042536 A1 | 2/2011 | Phillips et al. | |
| 2011/0199759 A1 * | 8/2011 | Bevirt | F16M 13/022 362/187 |
| 2011/0297718 A1 | 12/2011 | Klein | |
| 2012/0154754 A1 | 6/2012 | Maeda et al. | |
| 2012/0157454 A1 | 6/2012 | Papeo et al. | |
| 2013/0212305 A1 * | 8/2013 | Yin | H04N 9/3179 710/33 |
| 2013/0280985 A1 | 10/2013 | Klein | |
| 2014/0140686 A1 | 5/2014 | Weihe | |
| 2014/0267031 A1 | 9/2014 | Huebner | |
| 2014/0326839 A1 | 11/2014 | Zouev et al. | |
| 2015/0031459 A1 | 1/2015 | Kim | |
| 2015/0147932 A1 | 5/2015 | Vizcarra | |
| 2015/0226370 A1 | 8/2015 | Amussen | |
| 2016/0109057 A1 | 4/2016 | Kelkar | |
| 2016/0198842 A1 * | 7/2016 | Kang | B60B 33/04 108/1 |
| 2017/0363938 A1 | 12/2017 | Rossell | |
| 2018/0039167 A1 | 2/2018 | Rossell | |
| 2018/0364550 A1 | 12/2018 | Rossell | |

FOREIGN PATENT DOCUMENTS

| | | |
|---|---|---|
| CN | 200972043 Y | 11/2007 |
| CN | 201487493 U | 5/2010 |
| CN | 202453639 U | 9/2012 |
| CN | 202502339 U | 10/2012 |
| CN | 203720519 U | 7/2014 |
| CN | 203950109 U | 11/2014 |
| CN | 204331269 U | 5/2015 |
| CN | 104763865 A | 7/2015 |
| CN | 204942945 U | 1/2016 |
| JP | 2006-208901 A | 8/2006 |
| JP | 1339924 S | 9/2008 |
| JP | 2009-522516 A | 6/2009 |
| JP | 2012-078487 A | 4/2012 |
| JP | 2014-038129 A | 2/2014 |
| JP | 2014-115558 A | 6/2014 |
| WO | WO 2007/081388 A1 | 7/2007 |
| WO | WO 2011/089369 A1 | 7/2011 |

* cited by examiner

PROJECTOR HOLDER

CROSS-REFERENCE TO RELATED APPLICATIONS

This application is a continuation of and claims priority under 35 U.S.C. § 120 to U.S. patent application Ser. No. 15/998,759, filed Aug. 16, 2018. U.S. patent application Ser. No. 15/998,759 is a continuation of and claims priority under 35 U.S.C. § 120 to U.S. patent application Ser. No. 15/788,557, filed Oct. 19, 2017, now abandoned. U.S. patent application Ser. No. 15/788,557 is a continuation of and claims priority under 35 U.S.C. § 120 to U.S. patent application Ser. No. 15/376,518, entitled "PROJECTOR HOLDER" and filed Dec. 12, 2016, now U.S. Pat. No. 9,891,509, issued Feb. 13, 2018. U.S. patent application Ser. No. 15/376,518 claims priority under 35 U.S.C. § 119(e) to U.S. Provisional Application No. 62/351,527, entitled "PROJECTOR HOLDER" and filed Jun. 17, 2016. The entirety of each of the documents listed above is incorporated herein by reference.

FIELD

The disclosed embodiments are generally directed to projector holders and more particularly to a projector holder that is also usable as a projector stand.

BACKGROUND

Typically, protective projector holders include bags or rigid cases that have padding, such as foam, to protect the projector from damage. Typical projector stands include a tripod or other platform used to orient the projector for displaying a projected image at a desired height. The projector also may have a built-in stand.

SUMMARY

According to one aspect, an apparatus includes a body and a projector disposed at least partially within the body, the projector being usable to project visible light onto a surface. The body includes one or more pliable appendages that are arranged to be manipulated and deformed from a first configuration to a second configuration for mounting the apparatus to or placing the apparatus on an exterior of an object.

According to another aspect, a method of manufacturing an apparatus includes forming an apparatus having body with one or more pliable appendages and a projector at least partially disposed within the body. The one or more pliable appendages are arranged to be manipulated and deformed from a first configuration to a second configuration for placing the apparatus on or mounting the apparatus to an exterior of an object.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
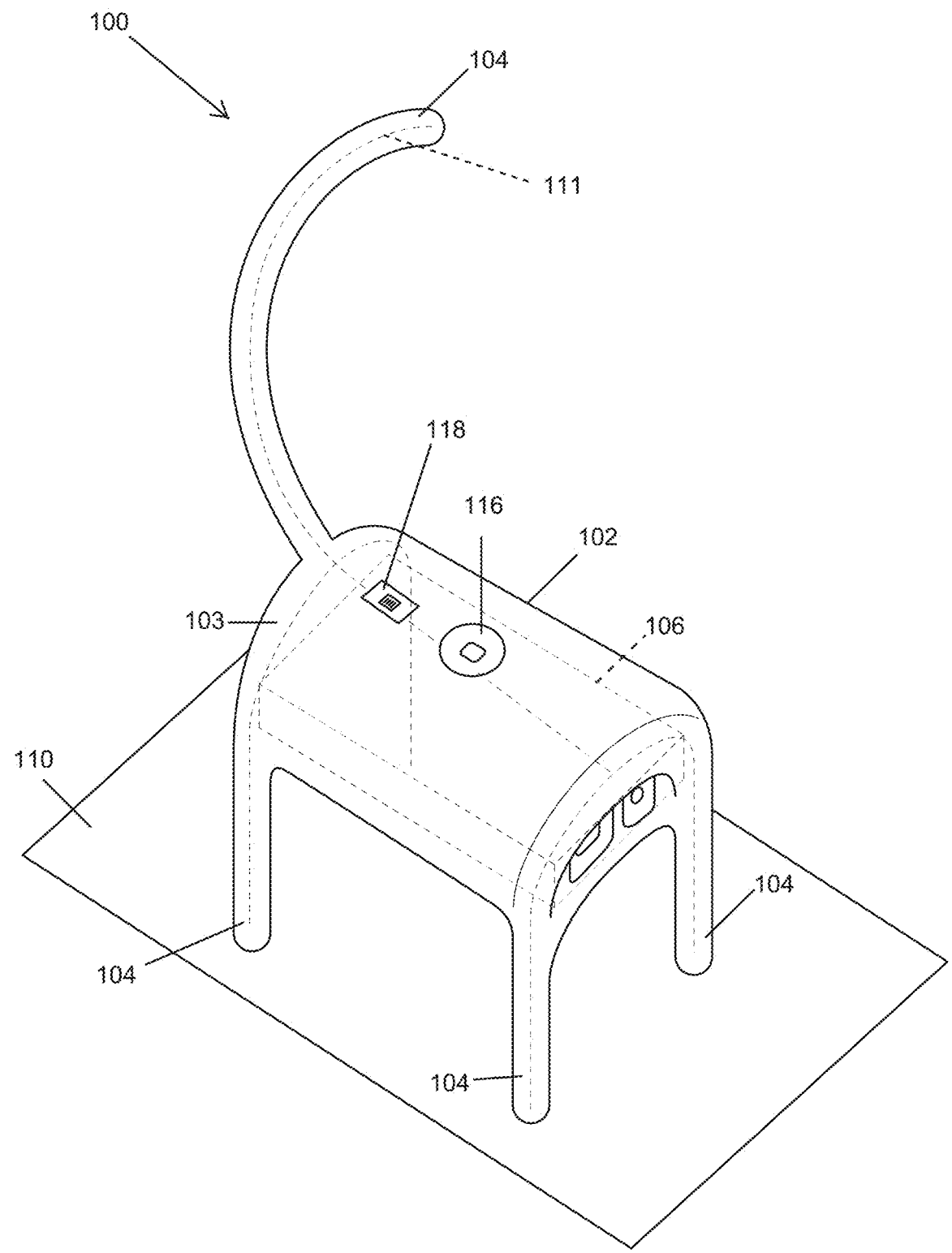
FIG. 1 is a perspective view of a projector holder according to one embodiment.

As is known, projector holders typically include protective bags or rigid cases that hold the projector in a padding, such as foam, to protect the projector from damage. Such holders are typically bulky and not usable as a projector stand. As such, the projector must be removed from the holder, placed onto a stand or surface, and oriented such that the visible light is projected onto a surface, such as a wall or screen, at a desired height that allows the image to be viewed by one or more people. For example, the projector may be removed from the holder, placed on a table, and the front of the projector may be raised so that the visible light is projected onto a wall at a height above the table. In such embodiments, because the projector is no longer housed in the protective holder, the projector may be damaged while being used. For example, the projector may break if a child accidentally knocks the projector onto the floor. The projector also may be damaged if the a liquid is spilled on the projector.

Various implements are known for orienting the projector such that the visible light is projected onto the surface at the desired height. For example, some projectors have a built-in stand, which typically includes one or more feet extendable from a bottom of the projector. Projectors also may be supported by various frames, tripods or other platforms that raise the projector, or at least a front of the projector, off of a surface (e.g., a table or the ground) for orienting the projector. Projectors also may be mounted to a wall or ceiling using a suitable mount. Such known implements, however, are limited to placing the projector on a flat surface, and in proximity to a power outlet. Additionally, projectors affixed to the ceiling and/or wall with the respective mount are done so more permanently, with the projectors being removable only for repair or replacement.

Applicant has recognized that by providing a projector holder that serves as both a protective housing and an instrument for orienting the projector to project light toward a surface, various advantages may be realized. To that end, embodiments disclosed herein include a holder having a body within which a projector is at least partially disposed. In some embodiments, the holder is formed of a material that is shockproof. The holder also may be formed of a material that is waterproof or water resistant, or of a material that is treated to be waterproof or water resistant. Applicant has also recognized that advantages may be realized by providing a holder that need not be powered by a power outlet. For example, the holder may include a power source (e.g., battery) that, in some embodiments, may be rechargeable (e.g., via a battery pack and/or a power outlet).

Applicant has also recognized that advantages may be realized by providing a projector holder that can be placed on, mounted, straddled, affixed or otherwise positioned to the exterior of any object, irrespective of whether the object is flat and/or oriented substantially horizontally. To that end, embodiments disclosed herein include a projector holder with a body having one or more pliable appendages that are arranged to be deformed by manipulating (e.g., by bending, curling, twisting, straitening, etc.) the appendages to place the holder on, mount the holder to, or otherwise position the holder on the exterior of the object. In such embodiments, the one or more appendages may be deformed from a first configuration to a second, different configuration for positioning the holder on the object. For example, the appendages may be deformed from a straight configuration to a bent configuration (e.g., by bending) for positioning the holder on the object. As will be appreciated, all of the appendages need not be deformed to the same second configuration for the holder to be positioned on the object. For example, a first appendage may be deformed into a bent configuration, a second appendage may be deformed into a twisted configuration, and a third appendage may not be deformed at all to position the holder on the object so as to project light on to a surface.

In such embodiments, the appendages may be formed of a pliable material that is sufficiently flexible such that the appendages may be deformed without cracking or otherwise breaking. The material(s) used to form the appendages also may be sufficiently shape retaining such that the appendages maintain the first and/or second configurations unless and until the appendages are manipulated.

As will be appreciated, by enabling a holder to be placed on, mounted or otherwise positioned on any object, irrespective of the object's shape or proximity to a power outlet, and enabling the holder to be shockproof, waterproof and/or water resistance, some embodiments of the invention may provide a holder which may be used in any environment or setting, both indoors and outdoors, and by any user, such as a child. For example, the holder may be placed on a bookshelf to display the image on a wall in a teen's bedroom. The holder also may be used on a campground, mounted to a folding chair or tree limb to display the image on a side of a tree, without worrying that the projector may be damaged if it falls or if it suddenly begins to rain.

For purposes herein, mounting the holder to the exterior of the object may mean that the pliable appendages are manipulated and deformed into the second configuration that holds the holder against the exterior of the object. For example, the appendages may be manipulated and deformed into a curled or twisted configuration such that the holder hangs from and/or grabs onto the exterior of the object. As will be appreciated, the holder may be removably mounted to the exterior of the object. For example, the holder may be mounted to the exterior of an arm of a chair while the projector is used to display an image on the surface and thereafter removed from the arm of the chair for storage.

For purposes herein, placing the holder onto the exterior of the object may mean that the one or more pliable appendages are manipulated and deformed into the second configuration and placed on the object. For example, one or more rear appendages may be manipulated and deformed into a bent configuration and one more front appendages may be manipulated into a straightened configuration for placement on a table. As will be appreciated, the one or more appendages need not be manipulated and deformed prior to placing the holder on the surface. For example, in an embodiment in which the appendages are already in a straightened configuration, the holder may simply be placed on the table.

Turning now to the figures, FIG. 1 shows a projector holder 100 according to one aspect of the present application. As shown in this figure, the projector holder 100 includes a body 102 having a torso 103 and appendages 104 extending outwardly from the torso 103. As shown in this figure, the holder 100 may include five appendages 104, although the holder may include more or fewer appendages. For example, the holder 100 may include one, two, three or more appendages in other embodiments.

The appendages may extend outwardly from one or more sides or other portions of the torso 103. For example, as shown in FIG. 1, the appendages may extend outwardly from a top and bottom of the torso 103. In other embodiments, the appendages may extend outwardly from only the top, only the bottom, or only one or more of the other sides of the torso (e.g., the right side or the right and left sides of the torso). The appendages also may extend from an edge and/or corner of the torso.

As will be appreciated, any suitable number of appendages may extend outwardly from a given side or other portion of the torso. For example, in some embodiments, as shown in FIG. 1, only one appendage 104 may extend from a side of the torso 103 (e.g., from the top of the torso). In other embodiments, more than one appendage may extend outwardly from a side of the torso. For example, in FIG. 1, four appendages extend outwardly from the bottom of the torso. As will be further appreciated, the number of appendages extending outwardly from each torso side or other portion may be the same, although the number of outwardly extending appendages also may vary.

The appendages also may be positioned at any suitable location on the sides or other portions of the torso. For example, as shown in FIG. 1, the appendages may be located at a periphery of the bottom and top of the torso. In other embodiments, the appendages may be located in the center of one of the sides.

In some embodiments, as shown in FIG. 1, the appendages 104 may be integrally formed with the torso 103. In other embodiments, one or more appendages may be removably attached to the torso. As will be appreciated, all appendages need not be removably attached or integrally formed with the torso. For example, the torso may be integrally formed with four integrally formed appendages, and a fifth appendage which is removably attachable to the torso.

In some embodiments, one or more of the appendages 104 are formed of a material that is sufficiently pliable to allow the appendages to be deformed by manipulating (e.g., by bending, twisting, curving, straightening, etc.) the appendages. The material also may be sufficiently shape retaining such that the appendage maintain the first and second configurations unless and until the appendages are manipulated. In some embodiments, the appendages are formed of a pliable metal, such as a pliable wire 111, that is coated with a second pliable material, as shown in FIG. 1. For example, the appendages may be formed of a copper wire that is covered in a silicone or rubber material. In some embodiments, the wire 111 may extend from the torso 103 to the end of the appendage 104. The wire 111 may have any suitable diameter, for example between about 1 mm and 3 mm, or about 2 mm in diameter.

As will be appreciated, the appendages may be formed of other pliable metals (e.g., wires) that are coated with other second pliable materials. As will be further appreciated, the appendages need be formed of a coated wire. For example, the appendages may be formed of other pliable materials or combination of materials, such as a shape retaining plastics.

All of the appendages 104 in the body 102 need not be pliable. For example, in an embodiment having five appendages, only four of the appendages may be pliable. All five appendages also may be pliable in other embodiments. As will be further appreciated, the entire length of each appendage 104 need not be pliable. For example, in some embodiments, only half of the appendage, e.g., the outermost portion of the appendage, may be pliable, although the entire appendage also may be pliable. Additionally, while the torso portion may be formed of a pliable material, it also may be formed of a material that is not pliable.

As will be appreciated, FIG. 1 may illustrate an example in which the holder 100 has been placed on the exterior of the object, such as on a surface 110, without first deforming the appendages via manipulation. For example, the appendages in FIG. 1 may have been in a straightened configuration and, thus, may have been simply placed on the surface 110. FIG. 1 also may illustrate an example in which all four appendages 104 have been manipulated and deformed into the straightened configuration before placement on a surface.

Figure 3:
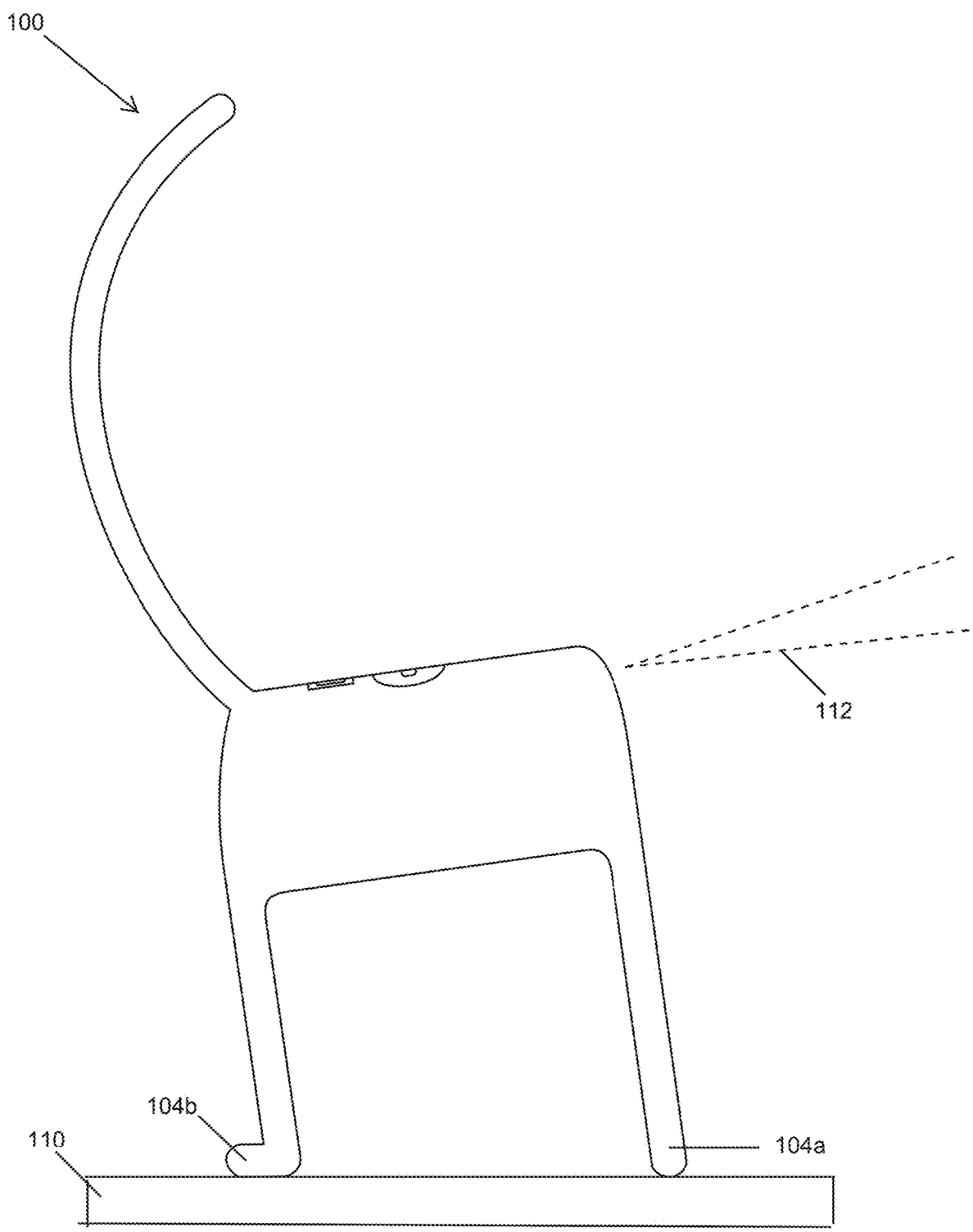
FIG. 3 is a side view of a projector holder placed on an exterior of an object according to one embodiment.

In some embodiments, all of the appendages are not be manipulated and deformed before placing the holder on the surface 110. In some embodiments, all of the appendages are not manipulated and deformed to the same second configuration. For example, as shown in FIG. 3, the rear appendages have been be manipulated and deformed to a bent configuration (e.g., from a straightened configuration) while the front appendages are in a straightened configuration. As will be appreciated, in such an example, the front appendages 104a in FIG. 3 may have been manipulated and deformed into the straightened configuration (e.g., from the bent configuration), however, they also may have already been in a straightened configuration and, thus, were not first manipulated. Once the holder is been placed on the surface 110, the front of the holder 100 is raised such that the visible light 112 may be projected at the desired height above the surface 110.

Figure 4:
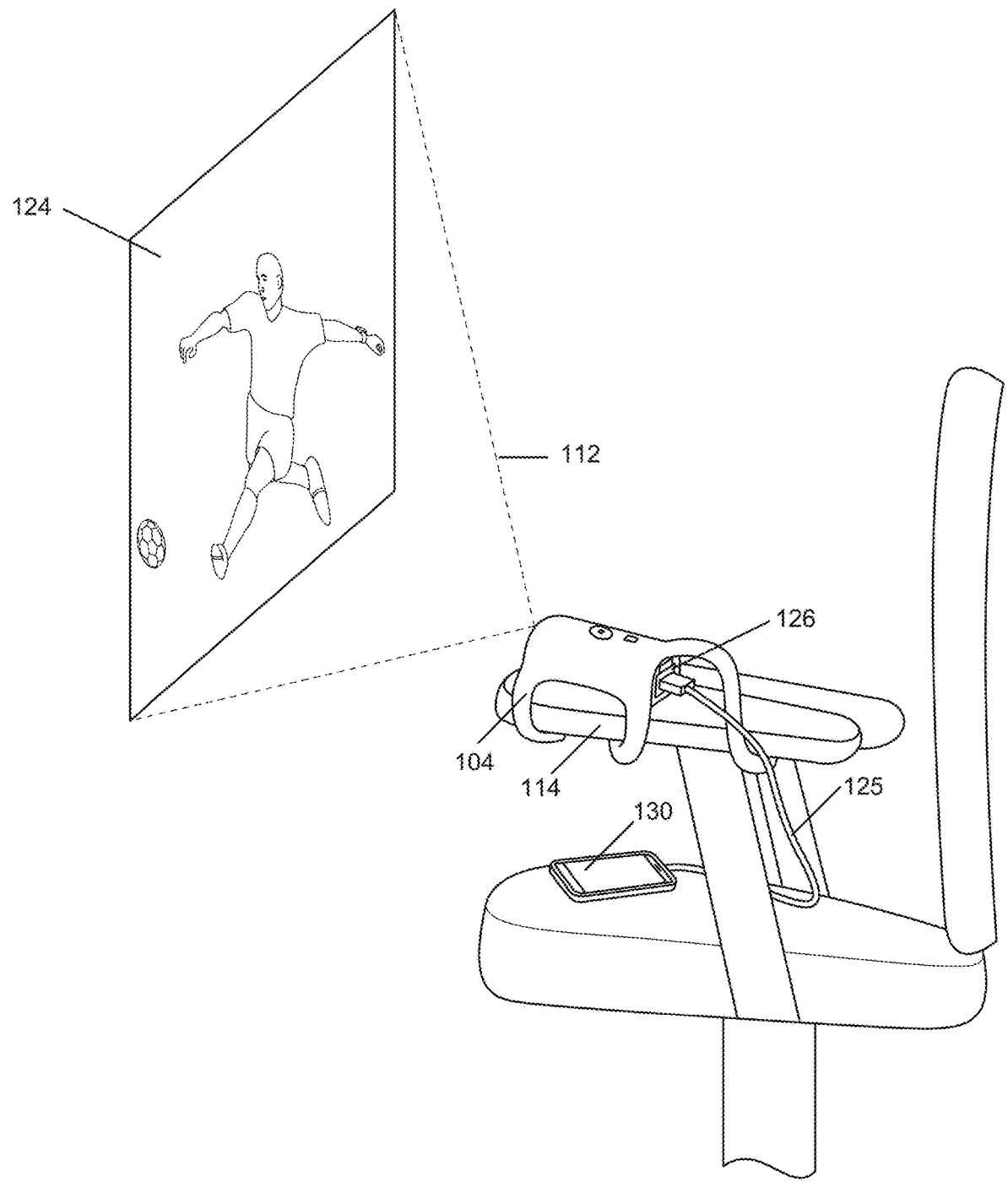
FIG. 4 is a perspective view of a projector holder mounted to an exterior of an object according to another embodiment.

In still another embodiment, the appendages may be manipulated and deformed to mount the holder to the exterior of the surface. That is, the appendages may be deformed to the second configuration to hold the holder 100 against the object. For example, as shown in FIG. 4, the appendages 104 have been manipulated and deformed such that the appendages are wrapped around an arm 114 of a chair, with the bottom of the holder being held against the top of the arm of the chair. Although all of the appendages 104 in FIG. 4 have been manipulated and deformed to hold the holder against the arm of the chair, in other embodiments, all of the appendages need not be used. For example, in one embodiment, only two of the appendages may be used to hold the holder to the arm of the chair.

Although the appendages in FIG. 4 have been manipulated and deformed such that the holder is in an upright position (e.g., with the bottom of the torso adjacent the top of the object), the holder 100 also may be mounted to the exterior of objects in other positions. For example, the holder may be mounted in an inverted position, with the bottom of the projector adjacent a bottom of the object. The holder also may be mounted such that the torso is positioned vertically, with the bottom of the projector adjacent a side of an object.

Turning back to FIG. 1, in some embodiments, a projector 106 may be disposed within the body 102 of the holder 100, such as within the torso 103 of the body 102. In some embodiments, as is shown, the projector 104 is completely disposed within the body 102. In other embodiment, the project may be only partially disposed within the body. For example, a front of the projector 106 (e.g., a side of the projector having a lens) may extend at least partially outside of the body 102.

For purposes herein, a projector includes an apparatus that projects visible light, such as an image, onto a surface. In some embodiments, the projector may project visible light rays via a lens. Projectors also may project an image via lasers. As will be appreciated, the projector may have any suitable size. For example, the projector may be a miniature projector or a full-size projector. The projector also may include a smart device, such as a smartphone, which is configured to project an image onto the surface. The projector may display two dimensional and/or three dimensional images. The projector also may display a holographic image. As will be further appreciated, the image may be a still frame such as a slide of a presentation or may be a movie.

In some embodiments, the projector may be integrally formed with the body, e.g., with both the torso 103 and appendages 104, such that the body and projector form a single, unitary device. As will be appreciated, in embodiments in which one or more appendages are removable, the projector may be integrally formed with just the torso or with the torso and one or more appendage, with one or more appendages also being removably attachable.

Figure 2:
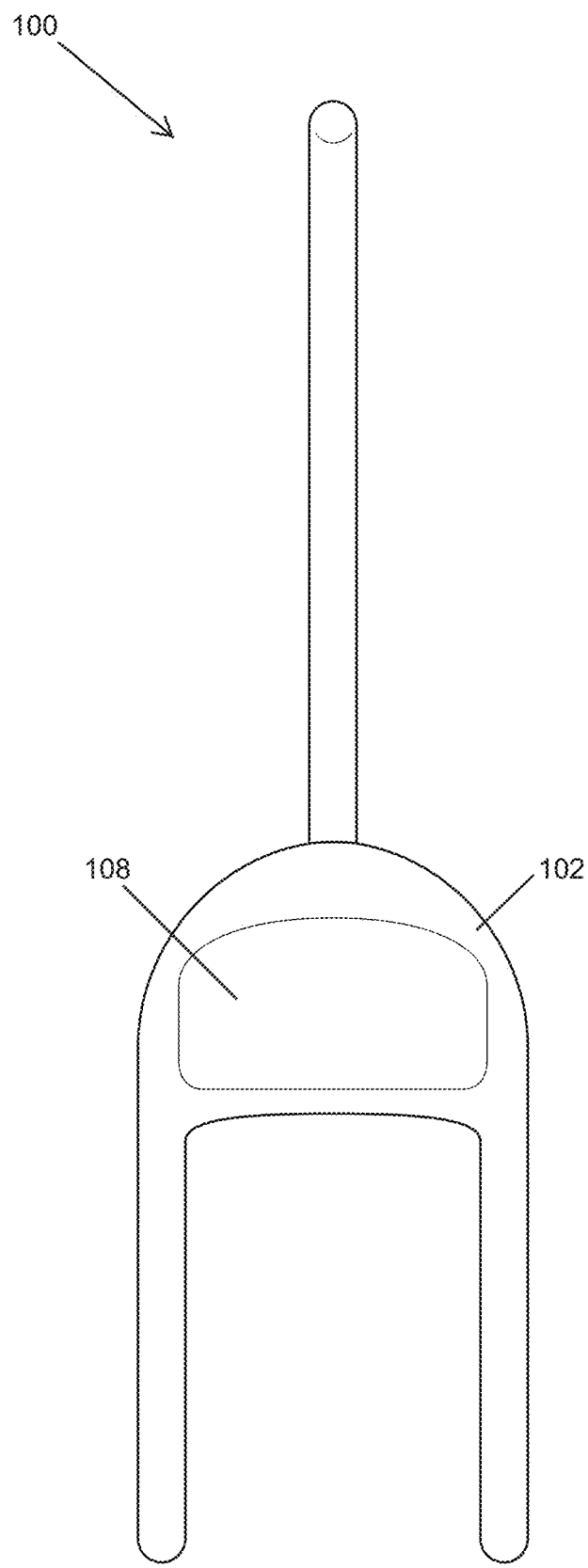
FIG. 2 is a front view of a projector holder according to another embodiment.

In other embodiments, the projector 106 may be removably attached to the body 102. For example, as shown in FIG. 2, the body 102 may include an opening 108 into which a projector 104 may be inserted. As with other embodiments, the projector 106 may be completely disposed within the opening 108 or may be only partially disposed within the opening. As will be appreciated, the projector 108 may be inserted into the opening 108 only while the projector is being used and thereafter removed. The projector 106 also may be inserted into the opening 108 for use and remain in the opening 108 for storage.

Turning back to FIG. 1, the holder may include one or more buttons to allow a user to operate the projector. In some embodiments, the buttons on the holder are the buttons on the projector. For example, the holder may include one or more openings through which a user may access the buttons on the projector. In one such example where the projector and holder are integrally formed, the projector may be covered with the material used to form the holder (e.g., a silicone or rubber material) except for where the projector buttons are located. In other embodiments, the holder may include buttons that correspond to and interact with the buttons on the projector. For example, the holder may include silicone or rubber buttons that activate the projector buttons (e.g., presses the projector buttons) when the user presses the holder button.

Figure 5:
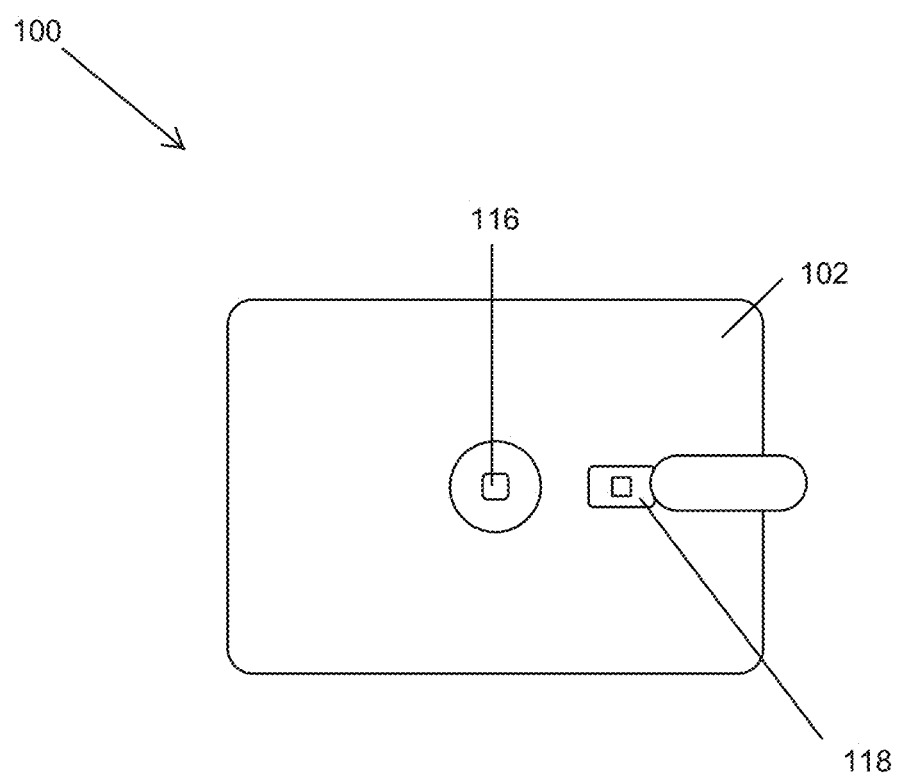
FIG. 5 is a top view of the projector holder of FIG. 1.

In some embodiments, as shown in FIGS. 1 and 5, the holder may include a power button 116 to allow the user to turn the projector on and off. In some embodiments, the holder 100 also may include a rotate image button 118, which allows the user to rotate the orientation of the image being projected. For example, in an embodiment in which the user mounts the holder to an object in the inverted position, the user may press the rotate image button until the image is displayed in the desired orientation (e.g., right side up). As will be appreciated, although both the power and rotate image buttons are shown on the top of the holder, in other embodiments the buttons may be located on another suitable side or portion of the holder.

Figure 6:
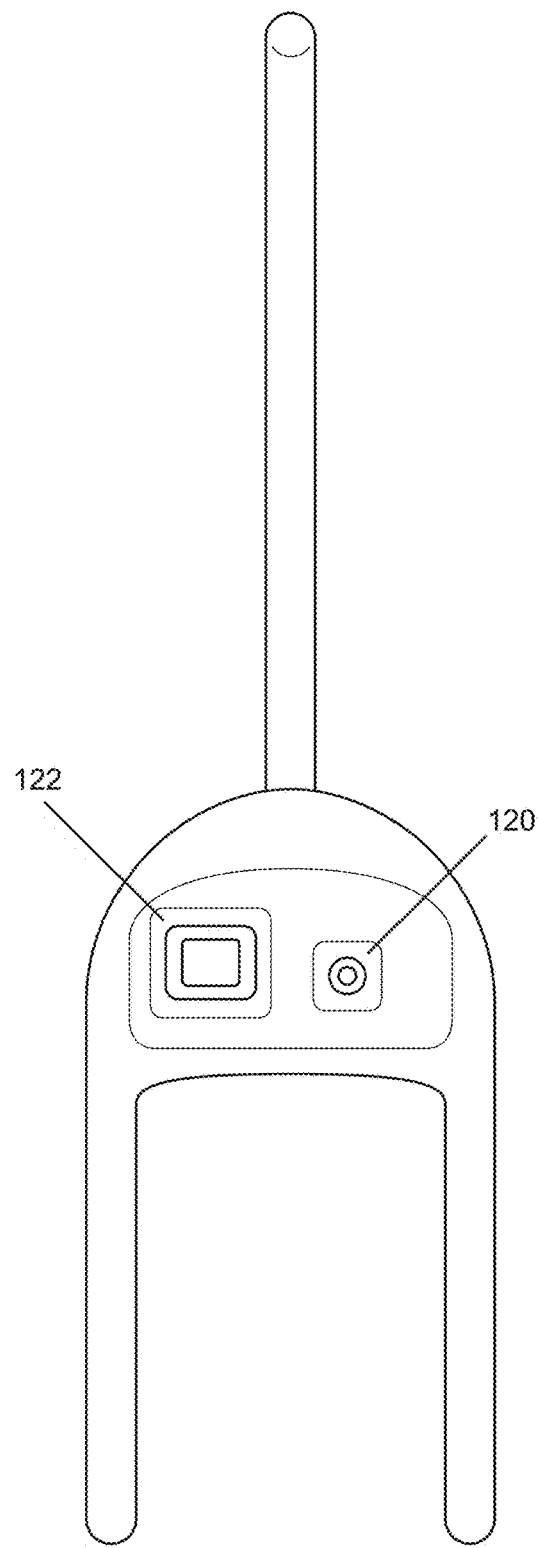
FIG. 6 is a front view of the projector holder of FIG. 1.

In some embodiments, as shown in FIG. 6, the holder also may have a keystone correction button 120. In such embodiments, the keystone correction button may be used to skew the projected image so that it appears rectangular. Such an adjustment may be made when the projector is not positioned perpendicular to the horizontal centerline of the surface on which the image is being projected. In some embodiments, as shown in FIG. 6, the keystone adjustment button 120 may be located on the front of the body 102. For example, the keystone adjustment button 120 may be located next to the lens/laser projector eye 122 through which the image is displayed onto a surface 124 (see FIG. 4). As will be appreciated, the keystone adjustment button 122 may be located on another suitable side of the holder in other embodiments.

Figure 7:
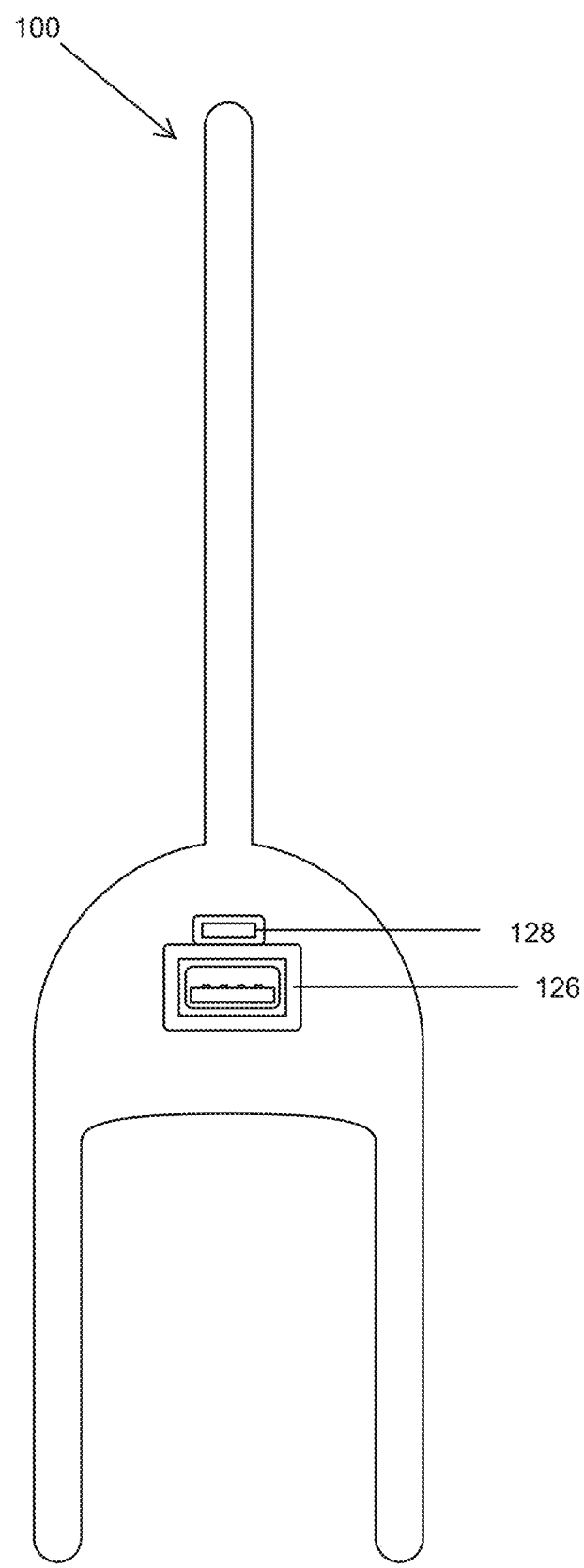
FIG. 7 is a rear view of the projector holder of FIG. 1.
Figure 8:
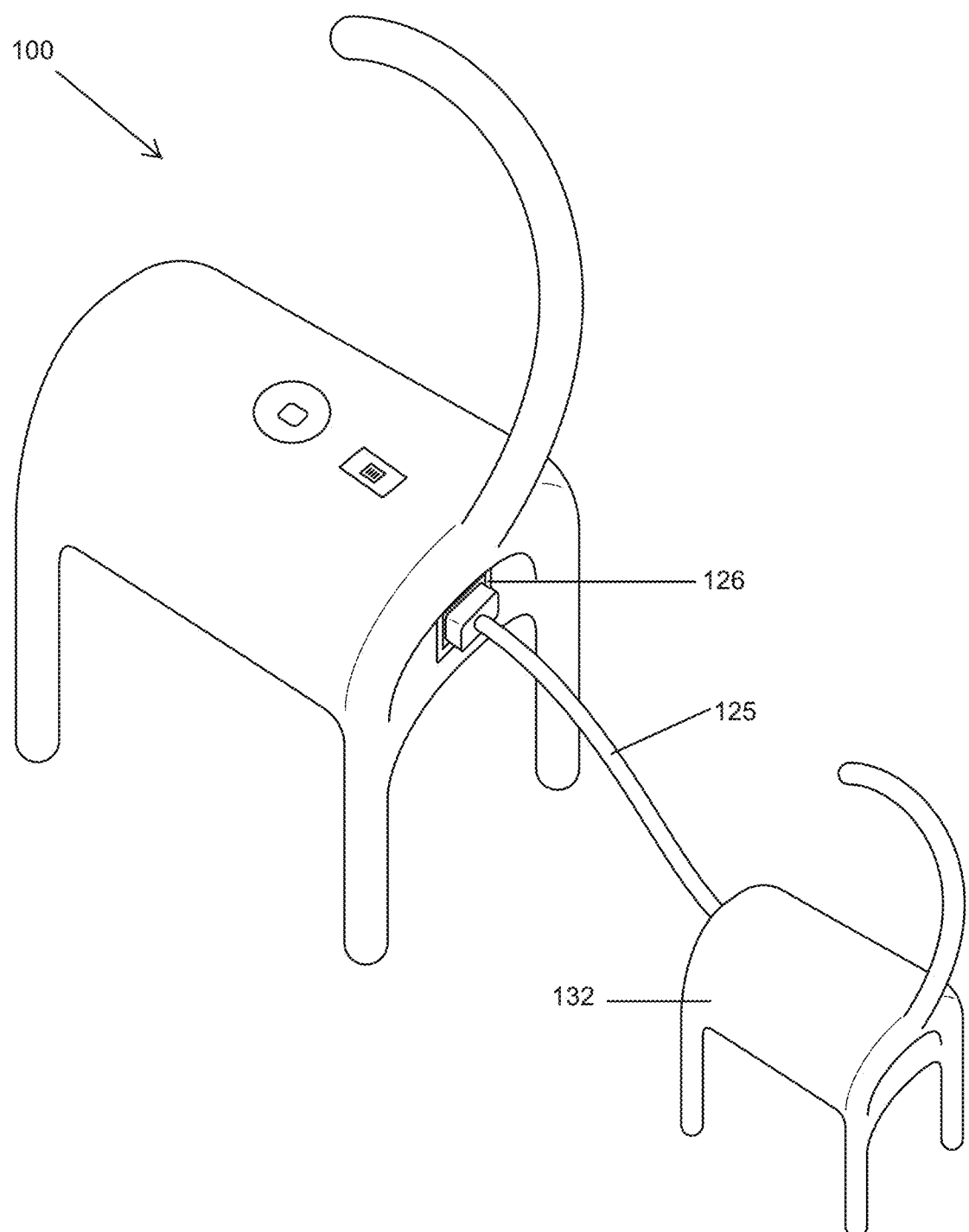
FIG. 8 illustrates a projector holder connected to a battery charger according to one embodiment.

Turning now to FIG. 7, which shows a rear side of the projector holder according to one embodiment. As shown in this figure, the projector holder may include one or more ports for connecting a peripheral device to the holder (and projector). As with the buttons, the holder ports also may be the ports of the projector, although the holder ports also may be separate ports that correspond to and interact with the ports of the projector. In some embodiments, the projector holder may include a USB port 126 and/or a lightning cable port 128 for connecting the projector to the peripheral device, such as a smart device (e.g., a smartphone or e-reader), a computer, and/or a battery charger (e.g., a battery pack or power adapter). For example, FIG. 4 shows the projector holder 100 being connected to a smartphone 130 via a USB cable 125 connected to the USB port 126. As another example, FIG. 8 shows the projector holder 100 connected to a battery pack 132 via the USB cable 125 and USB port 126 for charging the projector. As will be appreciated, although only USB and lightning cable ports are shown in FIG. 7, the holder may include other ports suitable for connecting the projector to a peripheral device. The holder also may include other ports to support communication protocols known now or developed in the future. As with other embodiments, although the ports are shown on the rear of the projector holder, the ports may be located on any suitable side of the projector.

Although the projector holder 100 is shown with one or more ports for wiredly connecting a peripheral device to the projector holder (and projector), it will be appreciated that the peripheral device(s) also may be wirelessly connected to the holder. For example, one or more peripheral devices may be connected to the holder (and projector) via a Bluetooth or other suitable wireless connection (such as a Wi-Fi or Li-Fi connection).

As will be appreciated, the projector holder 100 may include other suitable buttons and/or ports for operating the projector. For example, the holder may include buttons that allow the user to adjust the brightness and/or color saturation of the projector. The holder also may include one or more sensors that sense a condition (e.g., of the projector or of the environment) and send data back to the holder (and projector) for operating the projector. For example, the projector holder 100 may include an ambient light sensor (not shown), which may detect ambient light conditions. In such an example, the projector may be arranged to automatically adjust the brightness and/or color saturation of the image in response to the sensed ambient light.

Figure 9:
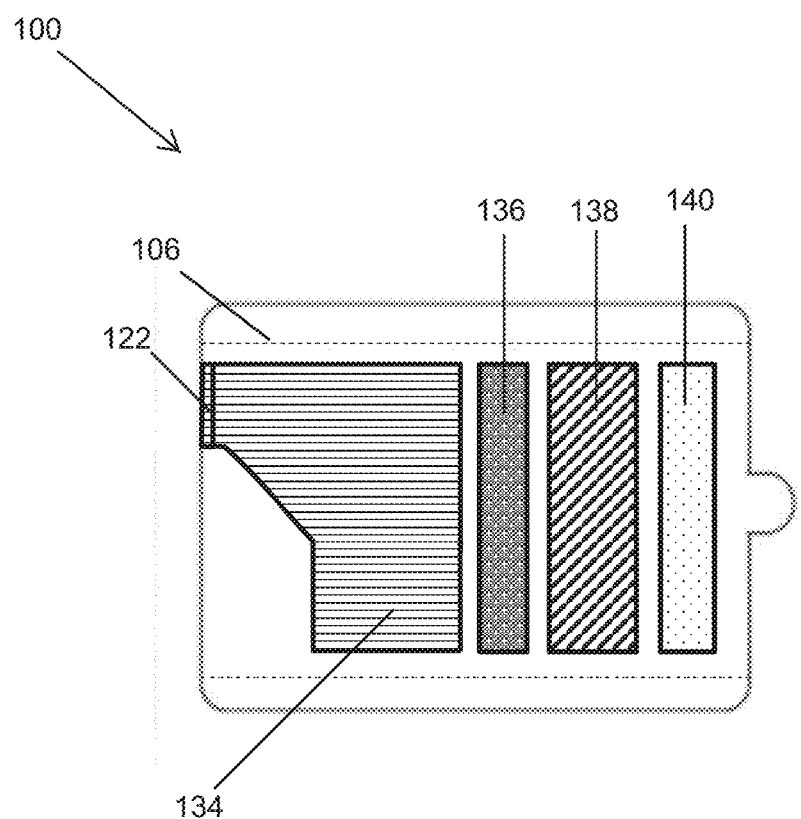
FIG. 9 is an illustrative arrangement of electric components of a projector according to one embodiment.

Turning now to FIG. 9, which shows a illustrative arrangement of the electrical components that may be housed in the interior of the projector. As will be appreciated, the components may be arranged in any order, not just the order shown in FIG. 9. As will be further appreciated, the projector may include additional or alternative components in other embodiments.

In some embodiments, as illustrated in FIG. 9, the projector may include a projection unit 134 that projects visible light via the projector eye/lens 122 The projector also may include a modem 136, a battery 138, and one or more ports 140 for connecting with one or more peripheral devices (e.g., a USB port) via a communication protocol. In some embodiments, the modem 126 is arranged to receive and modulate information (e.g., digital information) for transmission.

In some embodiments, the battery 138 may be arranged to power the projector 105 for between about 1 hour and about 4 hours. For example, the battery 138 may allow the projector to run for about 1.5 hours. As will be appreciated, the battery may be disposable or it may be reusable. In embodiments in which the battery is reusable, the battery may be charged by plugging the holder into a battery pack (see, e.g., FIG. 8) or into a power adapter that is thereafter plugged into a power outlet. In such embodiments, the holder 100 may be connected to the battery charger via a USB or lightning cable and one of the respective ports 126, 128. The rechargeable battery also may be charged via contact with or proximity to the battery pack 132. For example, the battery pack may be mounted to the holder (e.g., via one or more pliable appendages on the battery pack).

In some embodiments, the body includes a water resistant or waterproof material or a material that is treated to be water resistant or water proof for protecting the projector. For example, in one embodiment, the body may be formed of silicone, rubber, PVC, or wax, or of a material treated (e.g., laminated or coated) with a PVC, polyurethane, rubber, silicone elastomer, fluoropolymers and/or wax. Other water waterproof or water resistant materials and/or treatments also may be used.

In some embodiments, the holder is arranged to be shockproof. For example, the body may be formed of a material that protects the projector from damage if the holder was dropped. As will be appreciated, in some embodiments, only the torso is formed of a shockproof material while, in other embodiments, the torso and appendages are formed of a shockproof material. Some materials that are shockproof include a silicone, rubber, EVA, foam, or another suitable material.

In some embodiments, the torso 103 and appendages 104 are formed of the same material or combination of materials. For example, both the appendages 104 and torso 103 may be formed of a material that is pliable and also shockproof. For example, the appendages and torso may both be formed of a silicone or rubber material. In other embodiments, the appendages are formed of a different material than the torso. For example, the appendages may be formed of a material that is pliable (and possibly shock proof), while the torso is formed of a material that is only shock proof.

In some embodiments, the holder is arranged to act as a heat sink and dissipate heat generated by the projector. In some embodiments, for example, one or more wires 11 (e.g., copper wires) extend around the projector and/or into the appendages to dissipate heat. See, for example, FIG. 1, in which a wire 111 is shown extending around projector and into each of the appendages. As will be appreciated, other types of metal (e.g., wires), or other suitable heat sinks may be disposed in the body.

In some embodiments, the holder may be formed in the shape of an animal. In such embodiments, the appendages may corresponding to the limbs or other extremities of the animal. For example, as shown in FIG. 1, the body 102 may be in the shape of a monkey with four limbs (e.g., arms and legs) and a tail. As will be appreciated, the body 102 may also be formed in the shape of other animals, such as giraffes, lions, tigers, bears, dinosaurs, lizards, fish, octopuses, or other wild or domestic animals Although not shown in FIG. 1, the body also may include an appendage corresponding to the head of the animal (e.g., the head of the monkey).

As will be appreciated, the holder may be any suitable color or combination of colors. In some embodiments, the color or combination of colors corresponds to animal shape of the body. For example, in embodiments in which the body is in the shape of the monkey, the body may be brown.

In some embodiments, the exterior of the holder also includes one or more decorative features that correspond to the animal shape of the holder. For example, the appendages may have hands and feet. In another example, where the animal is a monkey, one of the hands may be holding a banana.

According to another embodiment, the holder is part of a kit used to display an image onto the surface. In such embodiments, the kit may include the holder, with the embedded projector, and a USB and/or lightning cable. As will be appreciated, the cable(s) may be any suitable length. For example, the cables may be between 3 feet and 12 feet long. For example, the cable may be 7 feet long. In some embodiments, the kit also may include a battery charger, such as the battery pack shown in FIG. 8, or a power adapter.

Figure 10:
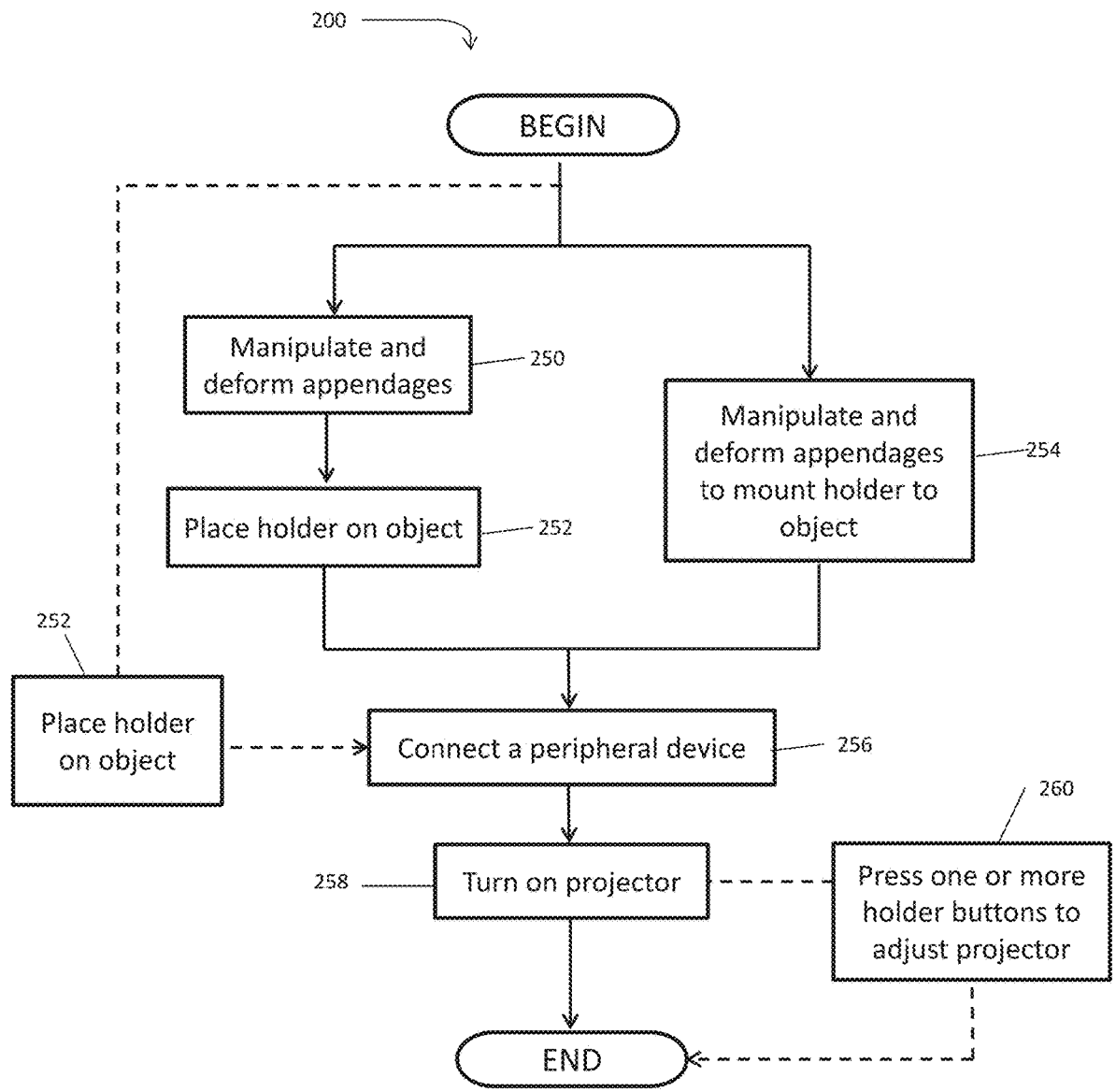
FIG. 10 is a flow chart of an illustrative method of using a projector holder.

According to another embodiment, as shown in FIG. 10, a method of placing on or mounting the holder to an object for displaying the image onto the surface 200 is disclosed. In some embodiments, the method includes manipulating and deforming one or more appendages 250 and placing the holder on the object 252. As will be appreciated, the holder also may be placed on the object 252 without first manipulating and deforming the appendages. In other embodiments, the method includes manipulating and deforming one or more appendages to mount the holder to the object 254 (e.g., to hold the holder against the exterior of the object). In such embodiments, manipulating the one or more appendages includes one of straightening, bending, curving, twisting, or otherwise moving the appendage to deform the appendages from a first configuration to a second, different configuration. As will be appreciated, each appendage may be manipulated and deformed in a different manner and may have different second configurations. For example, one appendage may be bent while another is straightened.

Once the holder has been mounted to or placed on the object, the method may include connecting a peripheral device 256 (e.g., a smartphone) via a wired or wireless connection and pressing the power button to turn on the projector 258. As will be appreciated, in other embodiments, the projector may be turned on via a remote control. The method also may include pressing one or more holder buttons to adjust the projector 260. For example, the method may include pressing the keystone adjustment button to adjust the image and/or pressing the rotate image button to rotate the image so that the image is in an upright orientation.

Figure 11:
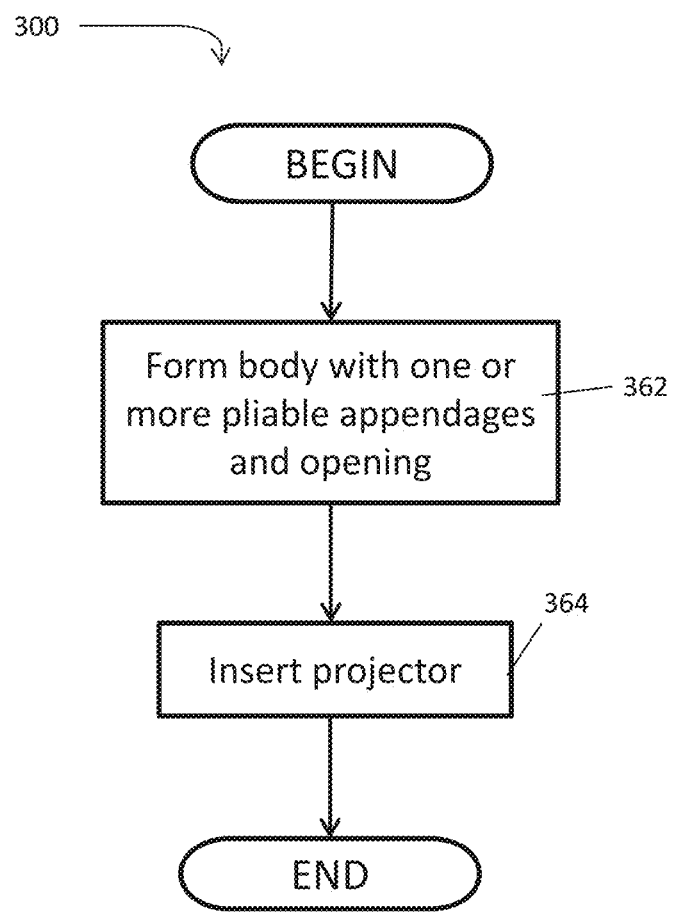
FIGS. 11-12 are flow charts of illustrative methods of manufacturing a projector holder.
Figure 12:
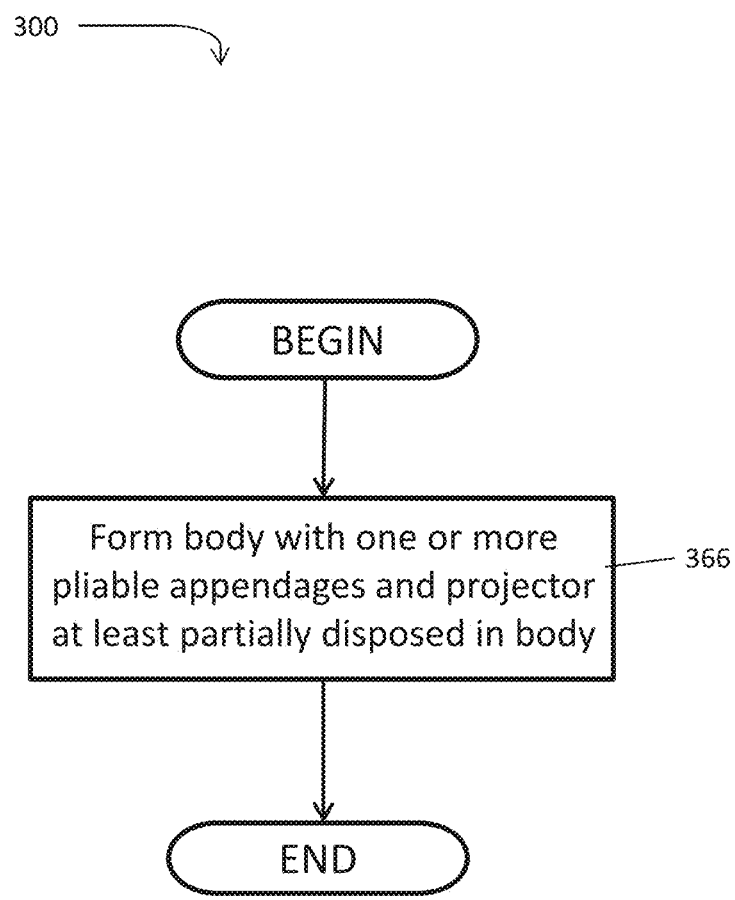

According to another embodiment, a method of manufacturing the holder 300 is disclosed. In some embodiments, as illustrated in FIG. 11, the method includes forming the body with one or more pliable appendages 362 and an opening into which the projector may be inserted. As will be appreciated, the projector may be inserted 364 into the opening during manufacturing and/or afterwards by the user 364. In such embodiments, the body may be formed by pouring a silicone or rubber material into a mold. In other embodiments, as illustrated in FIG. 12, in which the projector is integrally formed with the holder, the method includes forming a body with one or more pliable appendages and a projector at least partially disposed in the body 366. In some embodiments, this method includes placing the projector into the mold and pouring the silicone or rubber material into the mold and around the projector. In other embodiments, the method may include includes dipping or otherwise applying (e.g., via a layer-by-layer deposition) a silicone or rubber material to the outside of a projector until a body with one or more pliable appendages is formed.

In some embodiments, the method may include wrapping one or more copper wires around the projector, and in some embodiments outwardly from the projector to one or more appendages, prior to applying the silicone or rubber material. As will be appreciated, in some embodiments, the copper wires may be used to define the interior structure of the one or more appendages while the projector may be used to define the interior of the torso.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus comprising: a body comprising a plurality of flexible appendages configured to mount the apparatus to or place the apparatus on an object, the body comprising a surface having an opening; and a projector removably inserted into the opening so as to reside at least partially within the body, the projector being configured to project visible light onto a projection surface;

wherein the body includes at least one control for controlling an operation of the projector.

2. The apparatus of claim 1, wherein the at least one control includes a sensor for sensing an environmental condition around the apparatus.

3. The apparatus of claim 2, wherein the environmental condition relates to an amount of ambient light around the apparatus.

4. The apparatus of claim 3, wherein the at least one control is configured to automatically adjust at least one of a brightness and a color saturation of visible light projected by the projector in response to sensing the amount of ambient light around the apparatus.

5. The apparatus of claim 1, wherein the at least one control includes at least one of a button and a port usable for connecting a peripheral device to the projector.

6. The apparatus of claim 1, wherein the plurality of flexible appendages are usable for mounting the apparatus to or placing the apparatus on an object, the plurality of flexible appendages comprising a first appendage and a second appendage, the first appendage being deformable in a first way and the second appendage is being deformable in a second way that is different from the first way.

7. The apparatus of claim 6, wherein the first way is one of the group consisting of bending, twisting, wrapping around, curving and straightening, and the second way is another of the group.

8. The apparatus of claim 1, wherein one or more wires are disposed within the body and arranged to extend around at least a portion of the projector and into one of the plurality of flexible appendages, wherein the one or more wires are a heat sink.

* * * * *

UNITED STATES PATENT AND TRADEMARK OFFICE
CERTIFICATE OF CORRECTION

PATENT NO. : 11,126,070 B2
APPLICATION NO. : 16/460794
DATED : September 21, 2021
INVENTOR(S) : Joseph Christian Rossell Page 1 of 1

It is certified that error appears in the above-identified patent and that said Letters Patent is hereby corrected as shown below:

In the Claims

Column 12, Claim 6, Line 9, "the second appendage is being deformable" should read --the second appendage being deformable--.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*